United States Patent [19]

Niccum et al.

[11] 3,849,314
[45] Nov. 19, 1974

[54] FILTER MEDIA INSERTS
[75] Inventors: Forest G. Niccum, Wood Dale; Peter Heinrich, Jr., Chicago, both of Ill.
[73] Assignee: Marvel Engineering Company, Chicago, Ill.
[22] Filed: June 21, 1973
[21] Appl. No.: 372,218

[52] U.S. Cl. .............................. 210/493, 210/497
[51] Int. Cl. ........................................... B01d 27/06
[58] Field of Search ....... 55/521, 497, 498; 210/493

[56] References Cited
UNITED STATES PATENTS
3,361,260 1/1968 Buckman ........................... 210/493
3,531,920 10/1970 Hart ................................... 55/497

FOREIGN PATENTS OR APPLICATIONS
1,020,238 11/1957 Germany ........................... 55/521

Primary Examiner—Samih N. Zaharna
Assistant Examiner—F. F. Calvetti
Attorney, Agent, or Firm—Kinzer, Plyer, Dorn & McEachran

[57] ABSTRACT

A cylindrical filter member is formed from a pleated filter element. Each wall of the pleated filter element has integral projections, with the projections of adjacent walls contacting each other to provide uniform spacing.

1 Claim, 7 Drawing Figures 3,849,314
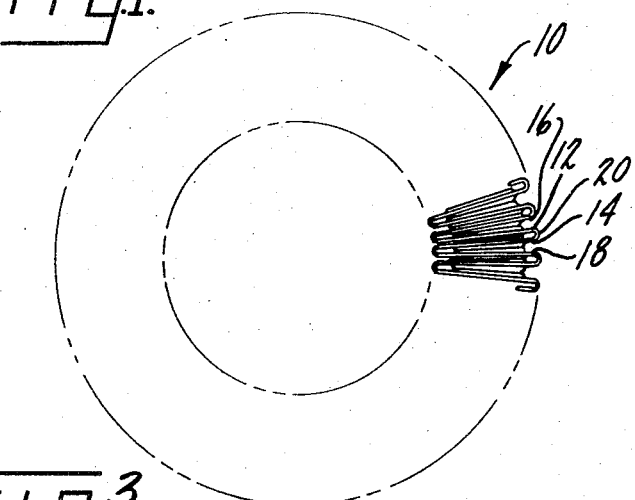
fig.1.
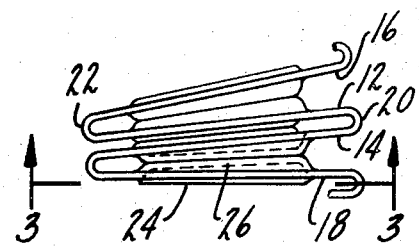
fig.2.
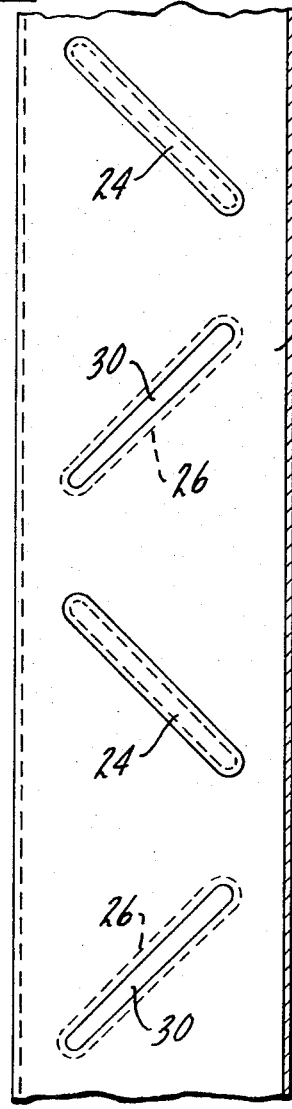
fig.3.
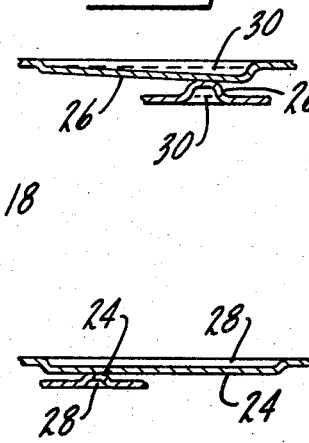
fig.5.
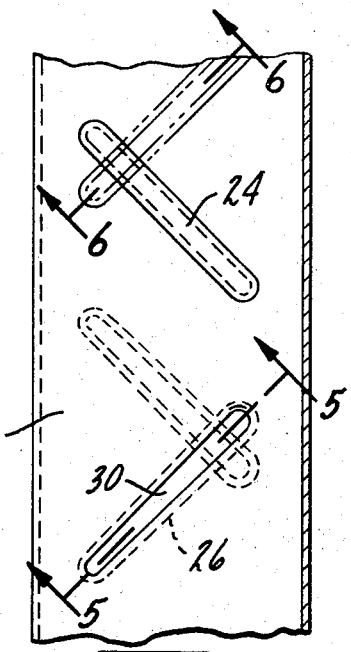
fig.4.
fig.6.
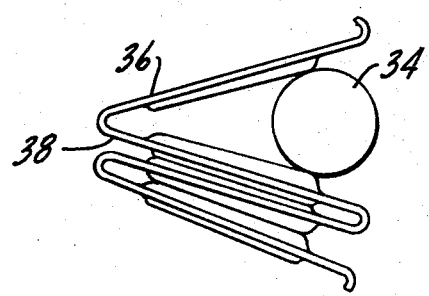
fig.7.

FILTER MEDIA INSERTS

SUMMARY OF THE INVENTION

The present invention relates to a cylindrical filter member and in particular to means for providing uniform spacing between adjacent pleat walls.

A primary purpose of the invention is a filter member of the type described in which each filter pleat wall has oppositely directed projections contacting similar projections on adjacent pleat walls.

Another purpose is a filter member of the type described in which the spacing varies uniformly.

Another purpose is a cylindrical filter member in which each pleat wall has differing adjacent projections extending in opposite directions from the pleat wall.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a cylindrical filter member showing a portion of the filter in detail, FIG. 2 is an enlarged top view of a portion of the filter member of FIG. 1, FIG. 3 is a section along plane 3—3 of FIG. 2, FIG. 4 is a partial vertical section, similar to FIG. 3, illustrating the relationship between adjacent pleat walls, FIG. 5 is a section along plane 5—5 of FIG. 4, FIG. 6 is a section along plane 6—6 of FIG. 4, and FIG. 7 is a partial top view of a modified form of filter member.

DESCRIPTION OF THE PREFERRED EMBODIMENT

The present invention relates to a filter element suitable for use in a filtering hydraulic fluid, oil or other types of liquids or gases which conventionally require a filter. The invention is particularly concerned with means for controlling the pleat spacing in such a filter so as to eliminate pleat collapse, provide even distribution of flow between pleats, and to increase filter life due to more efficient use of the filtering area.

In FIG. 1, a generally cylindrical filter member is indicated generally at 10. The cylindrical filter member will conventionally fit within a container. Fluid will normally flow from the outside, through the filter, to the inside where it is drawn off through a suitable discharge path.

The filter member 10 is pleated, with each pleat being formed by adjacent pleat walls, as indicated at 12 and 14 and at 12 and 16. Adjacent pleat walls 12 and 14 are joined by an outer fold 20, whereas, adjacent pleat walls 16 and 12 are joined by an inner fold 22.

Looking particularly at FIG. 3, a vertical section through a pleat and illustrating particularly pleat wall 18, note the integral projections of two different types, indicated at 24 and 26, extending from opposite sides of the pleat wall. Projection 24 is illustrated in detail in FIG. 6 and is shown to include a uniformly shaped depression 28 having a generally constant depth and a generally constant width. The depression 28 which forms projection 24 is substantially longer than it is wide. Of importance, however, is the fact that it has uniform depth and uniform width.

Projection 26 is illustrated in detail in FIG. 5. In this case, the depth of the depression 30 varies from an initial depth of approximately the thickness of the pleat wall, to a substantially greater maximum depth. In like manner, the width of the depression 30 tapers from the inside toward the outside, as particularly illustrated in FIG. 3.

When the filter member is assembled and the pleats are formed, projections of the type illustrated at 24 extending toward each other from adjacent pleat walls 12 and 14, which are joined by an outer fold 20, provide a uniform spacing between the pleat walls. The projections contact each other generally at an angle of about 90°, as illustrated in FIG. 4. Thus, the spacing between pleats having an outer fold is constant. In like manner, it should be noted from FIG. 2 that the spacing between pleat walls 12 and 16 which are joined by inner fold 22, uniformly varies or increases from the inside toward the outside. Since the depth of contacting projections 26 increases from the inside toward the outside, there is an increase in the pleat wall spacing from the inside toward the outside.

The projections are formed on each pleat wall in such a way that adjacent projections extend in opposite directions and also so that the axes of the projections, when extended, meet at an angle of approximately 90°, as illustrated in FIGS. 3 and 4.

FIG. 7 shows a modification of the invention in which a magnetic rod indicated at 34 is positioned between adjacent pleat walls 36 and 38. Such magnetic rods are illustrated in U.S. Pat. No. 3,371,790. There may be a series of such magnetic rods usable with a filter as disclosed herein. Normally such rods will be positioned between a pair of diverging adjacent pleat walls.

Of particular importance in the invention is the fact that the pleat spacing is rigidly controlled by the projections such that adjacent pairs of pleat walls are uniformly spaced from each other. There are two different forms of pleat wall spacing, that defined by the projections 26 and that defined by the projections 24. In both cases, the pleat spacing is controlled, thus preventing pleat collapse and flutter when the filter member is positioned in a filter housing. The pleats are supported at their most vulnerable point of collapse, that being at those portions of the pleat furthest from the upper and lower edges which are normally rigidly secured within a housing. Thus, not only are the pleats rigidly and correctly spaced, but they are strengthened and stiffened. A filter construction of the type shown herein thus provides increased filter life and even distribution of flow between all of the pleats as the spacing is rigidly controlled.

The material forming the filter element may vary For example, cellulose, screens, and other materials are all satisfactory.

Whereas the preferred form of the invention has been shown and described herein, it should be realized that there may be many modifications, substitutions and alterations thereto.

The embodiments of the invention in which an exclusive property or privilege is claimed are defined as follows:

1. A cylindrical filter member formed by a pleated filter element having a series of spaced pleat walls, and means integral with each wall of said pleated filter element for maintaining uniform pleat spacing including projections extending from opposite sides of each pleat wall, adjacent pleat wall projections extending from opposite sides of each pleat wall, projections from opposing walls being in contact with one another, each of said pleat wall projections having a length substantially greater than its width, with contacting pleat wall projections forming an angle on the order of about 90° with each other, inner and outer folds adjoining adjacent pleat walls, with the spacing between walls joined by an outer fold being substantially constant over the radial length of the wall, contacting projections between pleat walls joined by an outer fold having generally constant depth and width throughout the length thereof, the spacing between pleat walls joined by an inner fold gradually increasing from the inner fold toward the outside of the filter, with the depth and width of contacting projections spacing pleat walls joined by an inner fold gradually increasing from the inside of the filter element toward the outside of the filter element.

* * * * *